United States Patent [19]

Feldman

[11] Patent Number: 5,240,119
[45] Date of Patent: Aug. 31, 1993

[54] VIDEO SUPPORTING FURNITURE UNIT

[76] Inventor: Michael Feldman, 29 Chaim Pozner Street, Pisgat Zeev, Jerusalem 93546, Israel

[21] Appl. No.: 706,190

[22] Filed: May 28, 1991

[30] Foreign Application Priority Data

Jun. 21, 1990 [IL] Israel .................................. 94824

[51] Int. Cl.$^5$ .................................. A47F 7/00
[52] U.S. Cl. .................................. 211/13; 108/108; 248/917
[58] Field of Search ............... 211/40, 41, 13; 108/92, 108/106, 108, 28; 312/9.9, 9.47, 9.48, 9.52; 248/917, 918, 924; 273/148 B, DIG. 28

[56] References Cited

U.S. PATENT DOCUMENTS 2,180,480 11/1939 Richardson .
4,453,785 6/1984 Smith .
4,516,777 5/1985 Nikora .
4,646,655 3/1987 Robolin ............................ 108/108 X
4,943,029 7/1990 Szuster .............................. 248/917
4,993,558 2/1991 Assael ............................... 312/9.48

FOREIGN PATENT DOCUMENTS 2308279 11/1976 France .
2116020 9/1983 United Kingdom .

Primary Examiner—Robert W. Gibson, Jr.
Attorney, Agent, or Firm—Rogers & Killeen

[57] ABSTRACT

The invention provides a furniture unit for the support of a video set and video tape cassettes in conjunction with a television receiver, comprising a base element sized to be inserted under the television receiver, a first vertical side member rigidly attached to the base element at a position corresponding to one side of the television receiver, the vertical side member being configured to include storage racks for video cassettes, and a shelf element rigidly attached to the vertical element configured to support a video set above a television receiver, the major plane of the shelf element being parallel to the major plane of the base element.

17 Claims, 2 Drawing Sheets

VIDEO SUPPORTING FURNITURE UNIT

The present invention relates to a furniture unit, and particularly the present invention relates to a unit enabling the esthetic and practical arrangement of a video set and video cassettes in conjunction with an existing television receiver.

"Video—whoever doesn't own one yet—is buying now"—so runs a recent newspaper headline. This news item reflects what is undoubtedly a general trend, fueled by a sharp reduction in the price of video cassette recorders (known as video sets) and increased performance features for producing sharper and more colorful pictures and allowing the user a large variety of recording and playing options. Most purchasers of video sets already own a television receiver, and while it is possible to stand such a receiver on the floor, most television viewers own some form of stand, shelf, cabinet or arm for supporting the receiver. With the purchase of a video set, the need arises for a new shelf to support the video set near the television receiver, and preferably also to provide storage for video tape cassettes. Full size furniture units or items are available which meet this need adequately for those having the space and the funds for this purpose. Such stands, cabinets or rack systems are available supporting the video set either at the side of, or underneath, the television receiver. For those preferring mobility of the equipment, a popular support means is a 4-wheel twin-shelf trolley, the television receiver resting on the upper shelf and the video set on the lower shelf. However, no special arrangement is provided for the storage of cassettes in a manner facilitating convenient selection by the user. Many television receivers rest on low stands which provide no means for the additional support of a video set.

It is therefore one of the objects of the present invention to obviate the disadvantages of the prior art means of supporting video sets, and to provide a furniture unit which can be manufactured at low cost; will not require additional floor space; and which will provide suitable support for the video set, as well as for video tape cassettes, at a cost substantially below that of a full-sized cabinet.

This the present invention achieves by providing a furniture unit for the support of a video set and video tape cassettes in conjunction with a television receiver, comprising a base element sized to be inserted under said television receiver, a first vertical side member rigidly attached to said base element at a position corresponding to one side of said television receiver, said vertical side member being configured to include storage racks for video cassettes, and a shelf element rigidly attached to said vertical element configured to support a video set above a television receiver, the major plane of said shelf element being parallel to the major plane of said base element.

In the preferred embodiments of the present invention, each of said elements comprises a pair of spaced-apart rods.

Preferably, the distance between said pairs of spaced-apart rods is between about 15 and 25 centimeters, and said rods have a diameter of about 8 to 10 millimeters.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
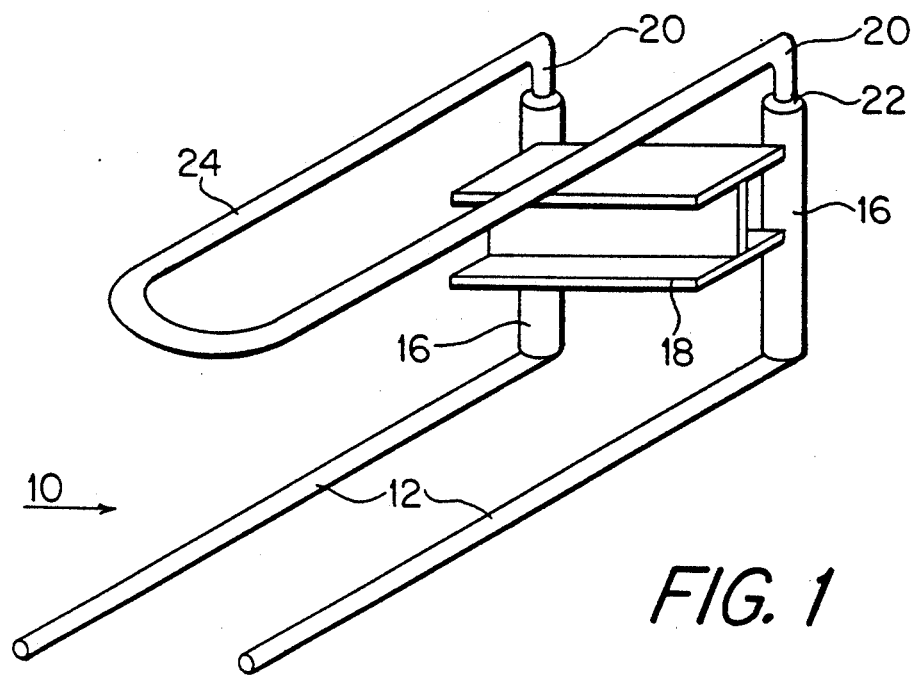
FIG. 1 is a perspective view of a first embodiment of the invention.
Figure 4:
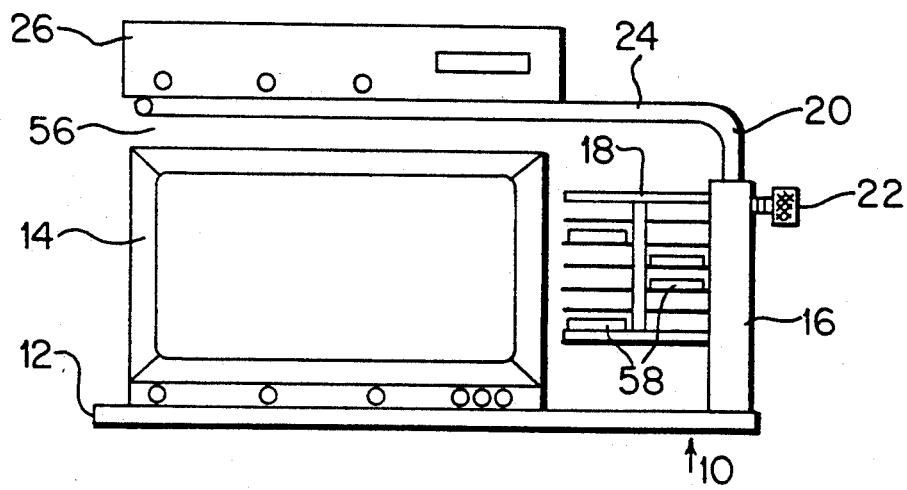
FIG. 4 is a front elevation showing the first embodiment of the invention in use.

There is seen in FIG. 1 a base element 10, comprising a pair of parallel rods 12 configured to support a television receiver 14, shown in FIG. 4. Metal rods between 8 and 10 millimeters diameter and spaced apart 15 to 25 centimeters have been found to be satisfactory, the television receiver resting on the rods 12 and serving to anchor the base element 10 in place. At one end of each rod 12 is rigidly attached a vertical tube 16, which supports a storage rack 18 sized to hold video tape cassettes. A vertical rod 20 is inserted in the upper opening of each vertical tube 16 and is held in place by a screw 22, the result of this arrangement being a height-adjustable telescopic joint. Attached to the rod 20, or as a bent-over extension thereof, is a shelf element 24 whose major plane is parallel to the base element 10. In the embodiment seen here the shelf element 24 has a U form and is made of a single metal rod. TV receivers 14 are made in various sizes, and the user will use the height adjusting feature described to set the shelf element 24 slightly above the upper surface of a TV receiver 14 resting on the base element 10, there remaining room for its ventilation and cooling and reducing the danger of electromagnetic interference between the TV receiver 14 and a video set 26 resting on the shelf element 24.

It will, of course, be realized by those skilled in the art that the proposed furniture unit may be manufactured using wood, metals or plastics as generally used for furniture, the shape and dimensions being adapted to suit the chosen material and that the base element can be any suitable size configured to support a television receiver, including a short supporting base element or pair of base elements attached to a wall bracket.

Figure 2A:
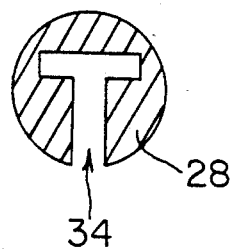
FIG. 2 is a perspective view of a second embodiment of the invention, FIG. 2a being a cross-sectional view one of the vertical members.
Figure 2:
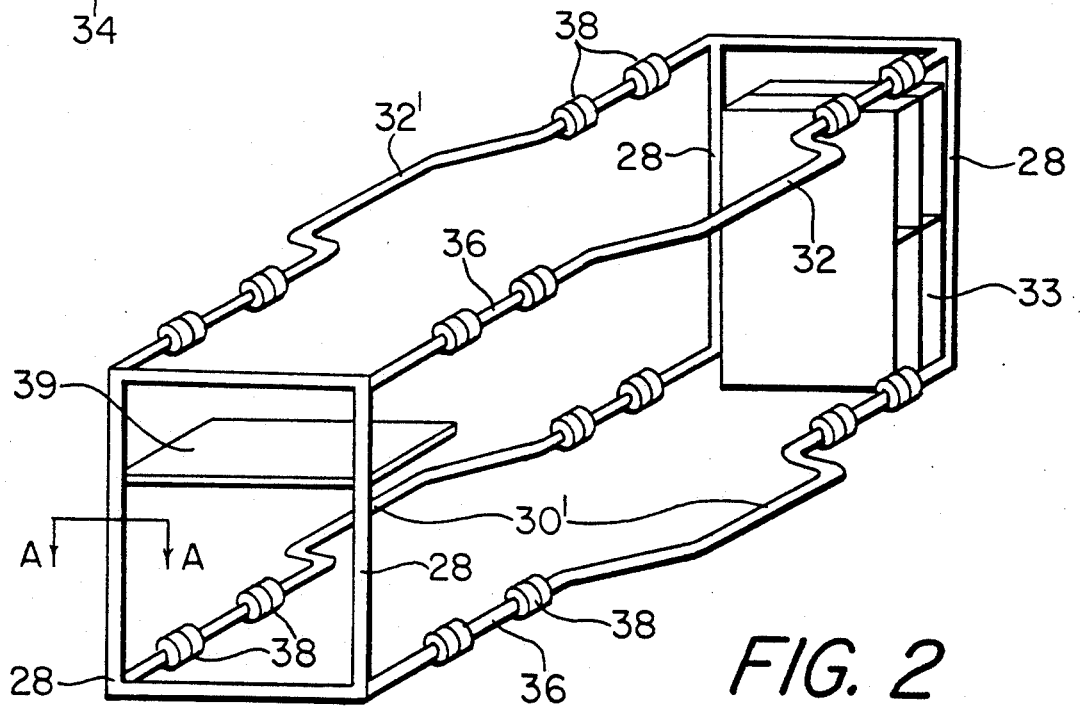

In FIG. 2 is seen an embodiment of the furniture unit wherein a framework is provided with vertical support members 28 at all four corners of the unit. The center portion of both base rods 30, 30' are bent outwards to provide a wide support base for a TV receiver 14. Similarly, the shelf element rods 32, 32' also extend outwards, thus providing better support for a large video set 26. A storage rack 33 is attached to the framework on one side, shelving 32 being attached at the other. FIG. 2a shows a cross-section taken at AA of FIG. 2 of a vertical support member 28. A slot 34 is provided to allow the attachment of shelving 32 at any desired height. Base rods 30, 30' and shelf element rods 32, 32' are composed of multiple discrete elements 36 connected by dismantable joints 38, whereby the furniture unit may be adjusted to a desired width and also taken apart for storage or transport. A hinge-mounted shelf 39 is supported in the slots 34. It may be noted that the complete furniture item is freestanding and need not be attached to the surface on which it stands.

Figure 3:
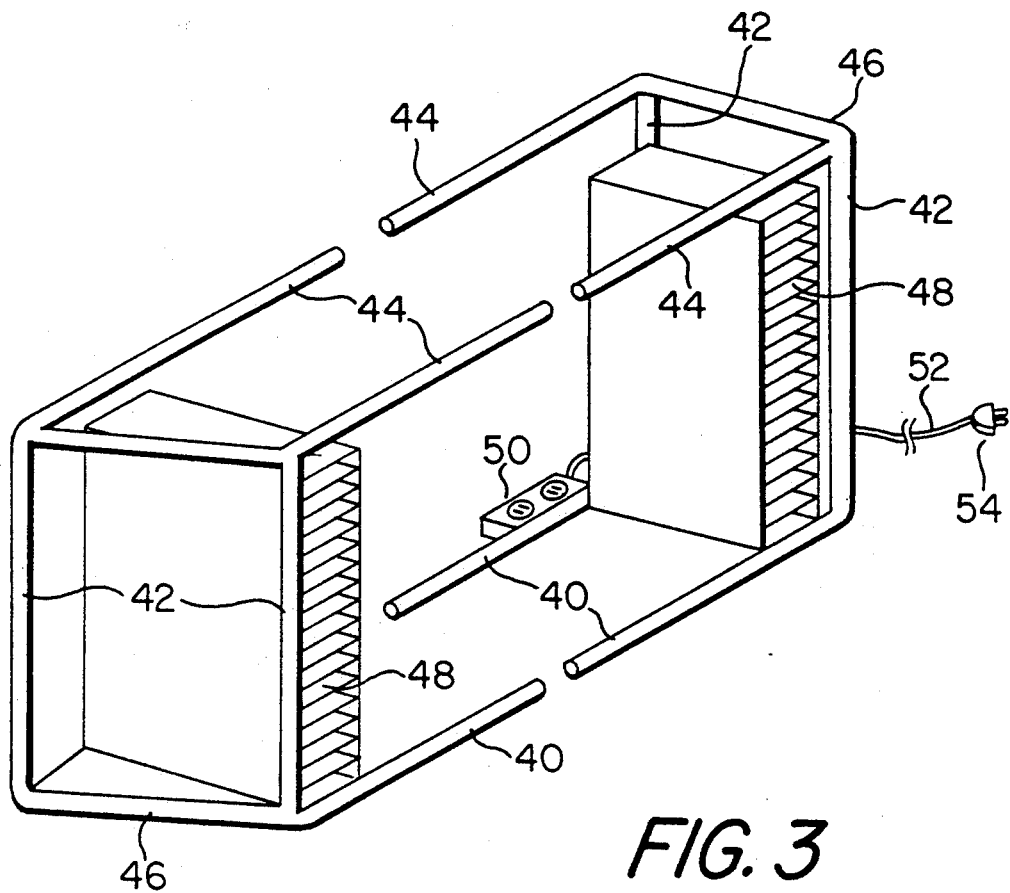
FIG. 3 is a perspective view of a third embodiment of the invention.

FIG. 3 shows an embodiment composed of two unconnected but complementary halves of a structure, each being composed of two base rods 40, each attached to vertical columns 42 which support a shelf rod 44. At least one horizontal connecting member 46 connects the two vertical columns 42. A storage rack 48 for video tape cassettes is provided and attached to the framework. As viewed from above, it will be noted that the two halves in combination form a split trapezoid. A twin-socket receptacle 50 is attached to a base rod 40, and a power cable 52 and a plug 54 are provided. This feature is convenient for users having to plug in only one plug 54, particularly where only a single wall socket (not shown) is available. The two half units can be used in separate spaced apart relationship or alternatively can be united into a single unit, such as seen with relation to FIG. 2, by using suitable connecter means (not shown).

In FIG. 4 is seen the first embodiment described with regard to FIG. 1, as in use. A TV receiver 14 rests on the base element 10, and a video set 26 is supported on the shelf element 24. A small void 56 appears between the two devices to facilitate cooling and to reduce electro magnetic interference. Video tape cassettes 58 are held in the storage rack 18.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A furniture unit for the support of a video set and video tape cassettes in conjunction with a television receiver, comprising a free-standing base element sized to be inserted under said television receiver, a first vertical side member rigidly attached to said base element at a position corresponding to one side of said television receiver, said first vertical side member including storage racks for video cassettes, and a shelf element rigidly attached to said vertical element configured to support a video set above a television receiver, the major plane of said shelf element being parallel to the major plane of said base element.

2. The furniture unit as claimed in claim 1, wherein each of said elements comprises a pair of spaced-apart rods.

3. The furniture unit as claimed in claim 2, wherein the distance between said pairs of spaced-apart rods is between about 15 and 25 centimeters.

4. The furniture unit as claimed in claim 2, wherein said rods have a diameter of about 8 to 10 millimeters.

5. The furniture unit as claimed in claim 1, wherein said first vertical side element member is height adjustable.

6. The furniture unit as claimed in claim 5, wherein said first vertical side member is composed of at least two telescoping elements.

7. The furniture unit as claimed in claim 1, further provided with a second vertical side member in spaced-apart relationship to said first vertical side member, there remaining space between said vertical side members for said television receiver.

8. The furniture unit as claimed in claim 7, wherein said second vertical side member is configured to provide storage for video cassettes.

9. The furniture unit as claimed in claim 8, wherein at least one of said vertical side elements is provided with shelving.

10. The furniture unit as claimed in claim 7, wherein said base element comprises two interfacing pairs of horizontal spaced-apart rods, each pair of rods being rigidly connected to one of the vertical side members.

11. The furniture unit as claimed in claim 7, wherein said base element is sized to be inserted underneath said television receiver, and is provided with said first and said second vertical side members respectively attached to said base element.

12. The furniture unit as claimed in claim 1, wherein said element is configured to be anchored in place by said television receiver.

13. The furniture unit as claimed in claim 1, further provided with a twin receptacle electric socket attached to the furniture item and a cable and plug capable of providing line power to both sockets.

14. A furniture unit for supporting a video set, video tape cassettes and a television receiver, the unit comprising:
   a base element sized to be inserted under and anchored in place by a television receiver;
   a vertical side member rigidly attached to said base element at a position corresponding to one side of the television receiver, said vertical side member including storage racks for video cassettes; and
   a shelf element rigidly attached to said vertical element for supporting a video set above the television receiver, the major plane of said shelf element being parallel to the major plane of said base element.

15. The furniture unit as claimed in claim 14 further comprising a twin receptacle electric socket attached to the furniture item and a cable and plug capable of providing line power to both sockets.

16. A furniture unit for supporting a video set, video tape cassettes and a television receiver, the unit comprising:
   a base element sized to be inserted under a television receiver;
   a vertical side member rigidly attached to said base element at a position corresponding to one side of the television receiver, said vertical side member including storage racks for video cassettes;
   an electric socket attached to the furniture item and a cable and plug capable of providing line power to both sockets; and
   a shelf element rigidly attached to said vertical element configured to support a video set above the television receiver, the major plane of said shelf element being parallel to the major plane of said base element.

17. A furniture unit for supporting a video set, video tape cassettes and a television receiver, the unit comprising:
- a base element sized to be inserted under a television receiver and having two interfacing pairs of horizontal spaced-apart rods;
- a first vertical side member rigidly attached to one pair of said two pairs of rods at a position corresponding to one side of the television receiver, said first vertical side member including storage racks for video cassettes;
- a second vertical side member rigidly attached to the other pair of said two pairs of rods in spaced-apart relationship to said first vertical side member, there remaining space between said first and second vertical side members for said television receiver; and
- a shelf element rigidly attached to said vertical element for supporting a video set above the television receiver, the major plane of said shelf element being parallel to the major plane of said base element.

* * * * *